(12) United States Patent
Shangguan et al.

(10) Patent No.: US 10,980,193 B2
(45) Date of Patent: Apr. 20, 2021

(54) PIGGYBACK WORKING APPLIANCE, PIGGYBACK BLOWER, AND CONTROL HANDLE ASSEMBLY

(71) Applicant: Globe (Jiangsu) Co., Ltd., Jiangsu (CN)

(72) Inventors: Yunjie Shangguan, Changzhou (CN); Xiaohul Huo, Changzhou (CN); Yin Chen, Changzhou (CN); Fangxiao Zhang, Changzhou (CN); Xiangxiao Jiang, Changzhou (CN); Lv Wei, Changzhou (CN)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 289 days.

(21) Appl. No.: 16/078,858

(22) PCT Filed: Feb. 14, 2017

(86) PCT No.: PCT/CN2017/073468
§ 371 (c)(1),
(2) Date: Aug. 22, 2018

(87) PCT Pub. No.: WO2017/143922
PCT Pub. Date: Aug. 31, 2017

(65) Prior Publication Data
US 2019/0045725 A1    Feb. 14, 2019

(30) Foreign Application Priority Data

Feb. 22, 2016    (CN) .......................... 201610095489.4
May 31, 2016    (CN) .......................... 201610372208.5
(Continued)

(51) Int. Cl.
*A01G 20/47*    (2018.01)
*F04D 25/08*    (2006.01)
(Continued)

(52) U.S. Cl.
CPC ............. *A01G 20/47* (2018.02); *A01G 20/30* (2018.02); *F04D 25/0673* (2013.01); *F04D 25/08* (2013.01)

(58) Field of Classification Search
CPC .... A01G 20/30; A01G 20/47; F04D 25/0673; F04D 25/08
See application file for complete search history.

(56) References Cited

U.S. PATENT DOCUMENTS 6,305,048 B1 * 10/2001 Salisian .................... A47L 5/36
                                                              15/326
9,192,222 B2    11/2015 Nashimoto et al.
(Continued)

FOREIGN PATENT DOCUMENTS

CN    205154407 U  *  4/2016  .............. F02D 11/02
CN    107653823 A  *  2/2018
(Continued)

OTHER PUBLICATIONS

WO-2017118276-A1—English machine Translation (Year: 2017).*

*Primary Examiner* — Marc Carlson
(74) *Attorney, Agent, or Firm* — Rooney IP, LLC

(57) ABSTRACT

A backpack tool, a backpack blower and a control handle assembly are provided by the present invention. The backpack tool includes a battery pack for providing electrical energy, a power assembly electrically connected with the battery pack to convert the electrical energy provided by the battery pack into mechanical energy, and a backpack assembly carried on the human back to support the battery pack and the power assembly. Both the battery pack and the power assembly can be carried on the human back using the backpack assembly, so that the weight carried by the arms of the worker can be reduced. The battery pack serves as a power source that reduces the noise and vibration caused by (Continued)

the backpack tool during operation as compared with a gasoline powered backpack tool.

11 Claims, 10 Drawing Sheets

(30) Foreign Application Priority Data

May 31, 2016 (CN) .......................... 201610372210.2
May 31, 2016 (CN) .......................... 201610372226.3

(51) Int. Cl.
*A01G 20/30* (2018.01)
*F04D 25/06* (2006.01)

(56) References Cited

U.S. PATENT DOCUMENTS

| | | | |
|---|---|---|---|
| 9,907,234 B2 * | 3/2018 | Poole | A01G 20/43 |
| 10,645,884 B2 * | 5/2020 | Poole | A01G 20/43 |
| 2004/0188230 A1 * | 9/2004 | Tate | E01H 1/0827 |
| | | | 200/43.17 |
| 2008/0172826 A1 * | 7/2008 | Rappin | A01M 7/0021 |
| | | | 15/405 |
| 2011/0146023 A1 | 6/2011 | Wada et al. | |
| 2012/0234412 A1 * | 9/2012 | Prager | E01H 1/0809 |
| | | | 137/565.01 |
| 2013/0312213 A1 | 11/2013 | Takahashi | |
| 2014/0147252 A1 * | 5/2014 | Takano | B25F 5/008 |
| | | | 415/119 |
| 2015/0113758 A1 * | 4/2015 | Nashimoto | E01H 1/0809 |
| | | | 15/327.5 |
| 2015/0113760 A1 * | 4/2015 | Fukunaga | A47L 9/248 |
| | | | 15/330 |
| 2015/0237808 A1 * | 8/2015 | Prager | A47L 5/14 |
| | | | 15/405 |
| 2016/0108924 A1 * | 4/2016 | Conrad | A01G 20/43 |
| | | | 417/423.7 |
| 2016/0198636 A1 * | 7/2016 | Poole | A47L 5/14 |
| | | | 15/327.5 |
| 2016/0265540 A1 * | 9/2016 | Tirone | F04D 19/002 |
| 2018/0094393 A1 * | 4/2018 | Takahashi | F04D 25/0673 |
| 2018/0163750 A1 * | 6/2018 | Landen | F04D 25/06 |
| 2018/0206620 A1 * | 7/2018 | Yamaoka | A45F 3/14 |
| 2019/0029191 A1 * | 1/2019 | Poole | A01G 20/43 |

FOREIGN PATENT DOCUMENTS

| | | | | |
|---|---|---|---|---|
| DE | 202015006183 U1 * | 1/2016 | ............. | F02D 11/02 |
| WO | WO-2017118276 A1 * | 7/2017 | ............... | E01H 1/08 |
| WO | WO-2017133458 A1 * | 8/2017 | ............. | H01H 19/02 |

\* cited by examiner

PIGGYBACK WORKING APPLIANCE, PIGGYBACK BLOWER, AND CONTROL HANDLE ASSEMBLY

CROSS-REFERENCE TO RELATED APPLICATIONS

This application is a US national application of International Application No. PCT/CN2017/073468 filed on Feb. 14, 2017, which claims the benefit of priorities to Chinese Patent Application No. CN201610095489.4 titled "A BACKPACK TOOL", filed with the Chinese State Intellectual Property Office on Feb. 22, 2016; Chinese Patent Application No. CN201610372208.5 titled "A OPERATING HANDLE AND A BACKPACK BLOWER INCLUDING THE SAME", filed with the Chinese State Intellectual Property Office on May 31, 2016; Chinese Patent Application No. CN201610372210.2 titled "BACKPACK TOOL", filed with the Chinese State Intellectual Property Office on May 31, 2016; and Chinese Patent Application No. CN201610372226.3 titled "A BACKPACK TOOL", filed with the Chinese State Intellectual Property Office on May 31, 2016, the entire disclosures of which are incorporated herein by references.

TECHNICAL FIELD

The present invention generally relates to a garden tool, and more particularly to a backpack tool, a backpack blower and a control handle assembly.

BACKGROUND

Generally, an existing lightweight hand-held blower is equipped with a battery pack having a capacity ranging from 200 Wh to 300 Wh, which has about 10 minutes' discharging time and is only suitable for home use. For professional workers, a professional blower with a high power and a long discharging time is needed. However, a large-capacity battery pack will increase the total weight of the blower, which means a heavy load is carried by the worker.

Further, existing professional backpack blowers are gasoline powered and use centrifugal air passages, which causes the blower to generate loud noise and strong vibration, to be difficult to clean during work, and cause environmental pollution.

Therefore, there is a requirement to provide an improved backpack tool, backpack blower and control handle assembly which can reduce the weight carried by the worker, and the noise and vibration caused thereby.

SUMMARY OF THE INVENTION

The present invention provides a backpack tool which can reduce the weight carried by the worker, and the noise and vibration caused thereby.

In an aspect, a backpack tool includes a battery pack for supplying power, a power assembly electrically connected to the battery pack for converting the electric energy provided by the battery pack into mechanical energy, and a backpack assembly carried on the human body to support the battery pack and the power assembly.

In some embodiments, the backpack assembly includes a receiving space for accommodating the battery pack and the power assembly.

In some embodiments, the battery pack is pluggably received in the receiving space of the backpack assembly.

In some embodiments, the battery pack and the power assembly are arranged in a left-right manner or in an upper-lower manner.

In some embodiments, the backpack tool has a wire electrically connecting the battery pack to the power assembly, and the backpack assembly defines a channel for accommodating the wire.

In some embodiments, the backpack assembly has a belt assembly for carrying the power assembly and the battery pack on the human body.

In some embodiments, the belt assembly includes at least one of a shoulder belt and a waist belt.

In some embodiments, the power assembly is connected with a function assembly, and the function assembly includes at least one of a blowpipe component, a water-spraying component and a grass-cutting component.

In another aspect, a backpack blower is provided according to one embodiment of the present invention. The backpack blower includes a battery pack for supplying electric energy, a power assembly electrically connected with the battery pack for converting the electric energy provided by the battery pack into mechanical energy, a backpack assembly carried on a human body to support the battery pack and the power assembly, and a blowpipe component connected to the power assembly to blow air out.

In some embodiments, the blowpipe component includes an elbow pipe, a flexible pipe and a straight pipe connected in turn, and the power assembly includes an axial fan assembly defining a first air vent, a motor duct and a second air vent connected in sequence, and an axial air duct is formed by connecting the motor duct to the elbow pipe through the second air vent.

In some embodiments, the axial fan assembly further includes a connecting pipe located upstream of the motor duct along an air flowing direction, and the connecting pipe is configured with a truncated cone shape and connected with the motor duct through a smaller diameter end thereof.

In some embodiments, the motor duct is rotatably connected with the elbow pipe.

In some embodiments, the backpack blower further includes a control handle assembly for controlling starting and stopping of the axial fan assembly.

In some embodiments, the control handle assembly comprises a speed-adjusting unit for controlling starting, stopping, and a speed of the axial fan assembly.

In some embodiments, the speed-adjusting unit has a fixing post, a speed-adjusting button rotatable around the fixing post and a guiding mechanism for guiding rotation of the speed-adjusting button.

In some embodiments, the speed-adjusting unit has a speed-adjusting switch and a first control circuit, the speed-adjusting button defines a first protrusion for connecting with the speed-adjusting switch during rotation, and the first control circuit is configured to control starting, stopping, and the speed of the axial fan assembly when the first protrusion is in contact with the speed-adjusting switch.

In some embodiments, the speed-adjusting unit further includes a reset spring connected with the speed-adjusting button to reset the speed-adjusting button.

In some embodiments, the control handle assembly further includes a speed-fixing unit to maintain the speed-adjusting button at a fixed position for making the speed of the axial fan assembly constant.

In some embodiments, the speed-fixing unit includes a speed-fixing knob provided with a knob body and a retaining portion, and the speed-adjusting button has a second protrusion abutting against the retaining portion of the speed-fixing knob during rotating the knob body of the speed-fixing knob to limit the speed-adjusting button to the fixed position.

In some embodiments, the speed-fixing unit further includes a fixing shaft penetrating the knob body through a threaded connection, and the retaining portion is driven to move along an axial direction of the fixing shaft when the knob body rotates around the fixing shaft.

In some embodiments, each axial end of the fixing shaft defines a damper for buffering the axial movement of the retaining portion.

In some embodiments, the damper includes a spring washer or a wave washer or a cup washer.

In some embodiments, the control unit further includes an extreme-speed unit for controlling the axial fan assembly at full power.

In some embodiments, the extreme-speed unit includes an extreme-speed button, a micro switch and a second control circuit, and the second control circuit causes the axial fan assembly to run at full power when the extreme-speed button is pressed to contact with the micro switch.

In another aspect, a control handle assembly for controlling the backpack tool or the backpack blower includes a speed-adjusting unit for controlling starting, stopping, and the speed of the backpack blower.

In some embodiments, the speed-adjusting unit has a fixing post, a speed-adjusting button rotating around the fixing post and a guiding mechanism for guiding rotation of the speed-adjusting button.

In some embodiments, the speed-adjusting unit has a speed-adjusting switch and a first control circuit, the speed-adjusting button defines a first protrusion for connecting with the speed-adjusting switch during rotation, and the first control circuit is configured to control starting, stopping, and the speed of the backpack blower when the first protrusion is in contact with the speed-adjusting switch.

In some embodiments, the speed-adjusting unit further includes a reset spring connected with the speed-adjusting button to reset the speed-adjusting button.

In some embodiments, the control handle assembly further includes a speed-fixing unit to maintain the speed-adjusting button at a fixed position for making the speed of the backpack blower constant.

In some embodiments, the speed-fixing unit includes a speed-fixing knob provided with a knob body and a retaining portion, and the speed-adjusting button has a second protrusion abutting against the retaining portion of the speed-fixing knob during rotation of the knob body of the speed-fixing knob to limit the speed-adjusting button to the fixed position.

In some embodiments, the speed-fixing unit further includes a fixing shaft penetrating the knob body through a threaded connection, and the retaining portion is driven along an axial direction of the fixing shaft when the knob body rotates around the fixing shaft.

In some embodiments, each axial end of the fixing shaft defines a damper for buffering the axial movement of the retaining portion.

In some embodiments, the damper includes a spring washer, a wave washer or a cup washer.

In some embodiments, the control unit further includes an extreme-speed unit for controlling the tool at full power.

In some embodiments, the extreme-speed unit includes an extreme-speed button, a micro switch and a second control circuit, and the second control circuit causes the tool to run at full power when the extreme-speed button is pressed to contact with the micro switch.

Accordingly, in comparison with existing technologies, the present invention has at least the following advantages:

Both the battery pack and the power assembly of the backpack tool and backpack blower can be carried on the human body through the backpack assembly, so that the weight carried by the worker can be reduced. Meanwhile, the noise and vibration caused by the backpack tool and backpack blower during work can be reduced as compared with a gasoline powered backpack tool.

Furthermore, starting, stopping, and the speed and the output power of the power assembly can be easily controlled through the control handle assembly, so that the function assembly connected to the power assembly can be controlled. For example, when the power assembly is an axial fan assembly and the function assembly is a blowpipe component, starting, stopping, and the speed and the output power of the axial fan assembly can be controlled via the control handle assembly, so that starting, stopping, and the speed of air blowing through the blowpipe component can be controlled. Then, the speed of the air can be adjusted to a maximum value when needed to clear away heavy objects (e.g., stones, fragments of bricks, etc.).

DETAILED DESCRIPTION

As recited in the background, existing high-power professional blowers are generally heavy because they may include a large-capacity battery pack. Further, some existing professional backpack blowers may be gasoline powered and use centrifugal air passages, which cause the blowers to generate high noise and strong vibration, to be difficult to clean during work, and cause environmental pollution.

Therefore, a backpack tool is provided to overcome the problems mentioned above. The backpack tool includes a battery pack for supplying power, a power assembly electrically connected to the battery pack for converting the electric energy provided by the battery pack into mechanical energy, and a backpack assembly carried on the human body to support the battery pack and the power assembly. Both the battery pack and the power assembly of the backpack tool can be carried using the backpack assembly, so that the weight carried by the arms of the worker can be reduced. Meanwhile, the battery pack used as a power source to supply power can reduce the noise and vibration caused by the backpack tool as compared with the gasoline powered backpack tool.

In order to clarify the objects, characteristics and advantages of the present invention, embodiments of the present invention will be described in detail in conjunction with the drawings.

Figure 1:
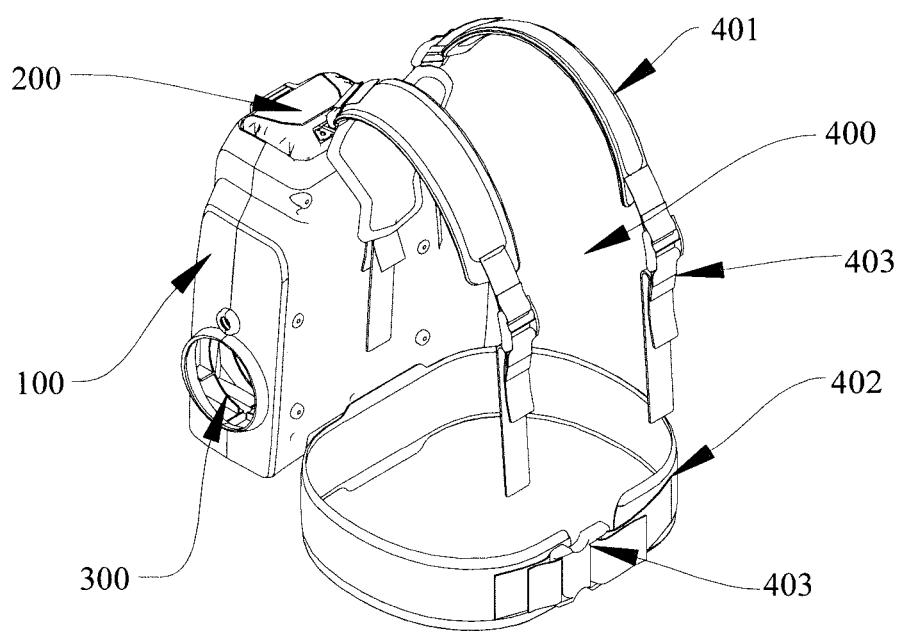
FIG. 1 is a schematic view of a backpack tool according to one embodiment of the present invention.

As shown in FIG. 1, a backpack tool according to one embodiment of the present invention is illustrated. The backpack tool includes a backpack assembly 100, a battery pack 200 and a power assembly 300.

The backpack assembly 100 is carried on human back for supporting the battery pack 200 and the power assembly 300 to reduce the load carried by arms of the worker. The battery pack 200 is used as a power source to supply electric energy for the backpack tool and the power assembly 300 is electrically connected with the battery pack 200 to convert the electrical energy provided by the battery pack 200 into mechanical energy and output a mechanical force or air flow.

The backpack assembly 100 can be configured with a hollow shape shown in FIG. 1, for example, the backpack assembly 100 includes a receiving space (not marked in FIG. 1) for accommodating the battery pack 200 and the power assembly 300.

The backpack assembly 100 can be configured as a bracket structure, and the battery pack 200 and the power assembly 300 are assembled on the backpack assembly 100.

It should be noted that, the backpack assembly 100 can be configured into any other structures to support and carry the battery pack 200 and the power assembly 300 on the human back.

In some embodiments, the battery pack 200 and the power assembly 300 can be configured as a unit, so that the battery pack 200 and the power assembly 300 can be integrally disposed in the backpack assembly 100, or integrally disposed on the backpack assembly 100.

In some embodiments, the battery pack 200 and the power assembly 300 can be provided as two separate and independent components.

In some embodiments, the battery pack 200 can be detachably disposed in the backpack assembly 100 or detachably disposed on the backpack assembly 100.

Figure 2:
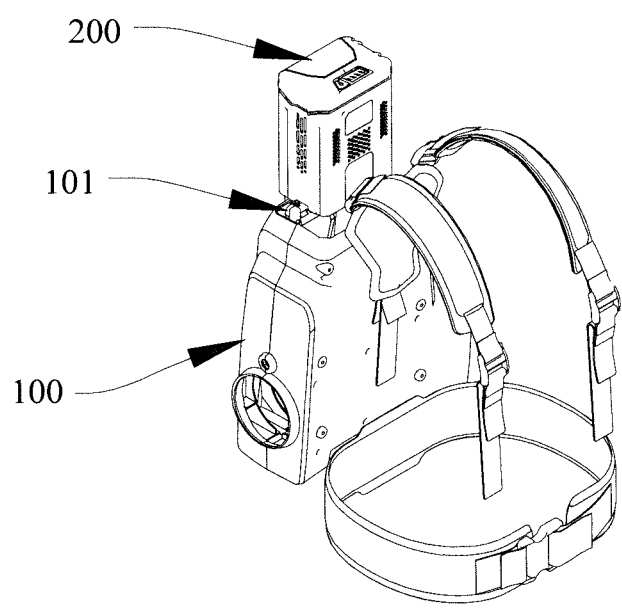
FIG. 2 is another schematic view of the backpack tool in FIG. 1 showing a battery pack removed from an inserting opening.

For example, the battery pack 200 can be pluggably inserted into the backpack assembly 100. Specifically, as shown in FIG. 2, the backpack assembly 100 can be configured with a hollow shape defines an inserting opening 101 for the battery pack 200 passing through to insert into or pull out from the receiving space thereof. The inserting opening 101 can be configured in a longitudinal direction (as shown in FIG. 2), or in a lateral direction. It should be noted that, the said "longitudinal direction" refers to an up to down direction when the backpack assembly 100 is carried on the human back and the inserting opening faces upwardly or downwardly. The said "lateral direction" refers to a left to right direction when the backpack assembly 100 is carried on the human back and the inserting opening 101 faces to the left or right side. It can be understood that, in some embodiments, the inserting opening 101 can be obliquely arranged on the backpack assembly 100 with respect to the longitudinal direction and the lateral direction.

Further, in order to protect the battery pack 200, in some embodiments, the backpack assembly 100 can be configured with a battery pack protection cover (not shown) to prevent the battery pack from accidentally escaping from the inserting opening 101 of the backpack assembly 100. In some embodiments, the battery pack protection cover may be further configured to possess dustproof and waterproof functions.

In some embodiments, the battery pack 200 may be non-detachable, that is, the battery pack 200 is not detachably disposed in or on the backpack assembly 100.

In some embodiments, the power assembly 300 can be detachably located in or assembled on the backpack assembly 100. Or the power assembly 300 can be non-detachably located in or assembled on the backpack assembly 100.

It should be noted that, the battery pack 200 and the power assembly 300 can be detachable or non-detachable when configured into an integral structure.

It also should be noted that, the battery pack 200 and the power assembly 300 may be completely or partly accommodated in the backpack assembly 100. In other words, the battery pack 200 and the power assembly 300 could be completely or partly enclosed by the backpack assembly 100.

It also should be noted that, when the battery pack 200 and/or the power assembly 300 is non-detachable, the battery pack 200 and/or the power assembly 300 can not be arbitrarily detached from the backpack assembly 100 without disassembling the backpack assembly 100. For example, when the battery pack 200 is non-detachably disposed in the backpack assembly 100, the battery pack 200 can not be drawn out from the backpack assembly 100 without taking the backpack assembly 100 apart.

As shown in FIG. 1 and FIG. 2, the battery pack 200 and the power assembly 300 could be configured in an upper-lower manner. For example, the battery pack 200 is disposed at an upper portion of the backpack assembly 100 while the power assembly 300 is disposed at a lower portion of the backpack assembly 100. Or the battery pack 200 is be disposed at the lower portion of the backpack assembly 100 while the power assembly 300 is disposed at the upper portion of the backpack assembly 100. The battery pack 200 and the power assembly 300 also can be configured in a left-right manner (referring to FIG. 6 and FIG. 7).

In some embodiments, the battery pack 200 is electrically connected with the power assembly 300 via a wire (not shown in FIG. 1 and FIG. 2).

Specifically, in some embodiments, the backpack assembly 100 is configured with a channel (not shown in FIG. 1 and FIG. 2) for accommodating the wire. The wire has one end connected with the battery pack 200 and another end provided with a plug for engaging with a socket of the battery pack 200 to achieve the electrical connection between the battery pack 200 and the power assembly 300 when the battery pack 200 inserted into the backpack assembly 100. In some embodiments, the other end of the wire may be provided with a first contact pad (e.g., metal pad), and the battery pack 200 may be provided with a second contact pad contacting with the first contact pad of the wire to achieve the electrical connection between the battery pack 200 and the power assembly 300. The electrical connection between the battery pack 200 and the power assembly 300 may be achieved other manners.

In some embodiments, the battery pack 200 can be re-chargeable.

As shown FIG. 1, a belt assembly 400 is assembled on the backpack assembly 100 for supporting the backpack assembly 100 together with the battery pack 200 and the power assembly 300 on the human back. The belt assembly 400 is fixed on the backpack assembly 100 by rivets or screws.

The belt assembly 400 includes a waist belt 402 fixed to the backpack assembly 100 and a shoulder belt 401 having one end connected with the backpack assembly 100 and the other end connected with the waist belt 402.

A buckle (not shown in FIG. 1) is arranged at a position where the shoulder belt 401 is connected to the waist belt 402. The shoulder belt 401 is connected to the waist belt 402 through the buckle.

In one embodiment, the belt assembly 400 can only include the shoulder belt 401 fixed to the backpack assembly 100.

In one embodiment, the shoulder belt 401 can be one-shoulder diagonal strap or a backpack belt.

In one embodiment, the shoulder belt 401 and the waist belt 402 can have elasticity to improve comfort thereof.

In one embodiment, an adjusting mechanism 403 for adjusting length is arranged on at least one of the shoulder belt 401 and the waist belt 402, so as to allow adjustment of the lengths of the shoulder belt 401 and/or the waist belt 402.

In one embodiment, there may be one or more of the shoulder belts 401 and/or the waist belts 402. For example, in the embodiment as shown in FIG. 1, the belt assembly 400 includes two shoulder belts 401 and one waist belt 402.

It can be seen that, the backpack assembly 100, the battery pack 200 and the power assembly 300 are carried on the human back using the belt assembly 400, so that the load carried by arms of the operator is reduced. And the battery pack 200 can reduce the noise and vibration caused by the backpack tool. Meanwhile the backpack tool is easily cleaned and the environment is protected.

In addition, the backpack tool provided by the present invention can achieve different functions by connecting with different function assemblies. Specifically, the power assembly 300 of the backpack tool can be connected with a specific function assembly, so that a specific function can be achieved under cooperation of the mechanical force or the air flow output from the power assembly of the backpack tool and the function assembly.

In one embodiment, the function assembly includes a blowpipe component, a water-spraying component or a grass-cutting component. The backpack tool can achieve blowing or suction action when connected with the blowpipe component. The backpack tool can achieve water-spraying action when connected with the water-spraying component. The backpack tool can achieve grass-cutting action when connected with the grass-cutting component.

Figure 3:
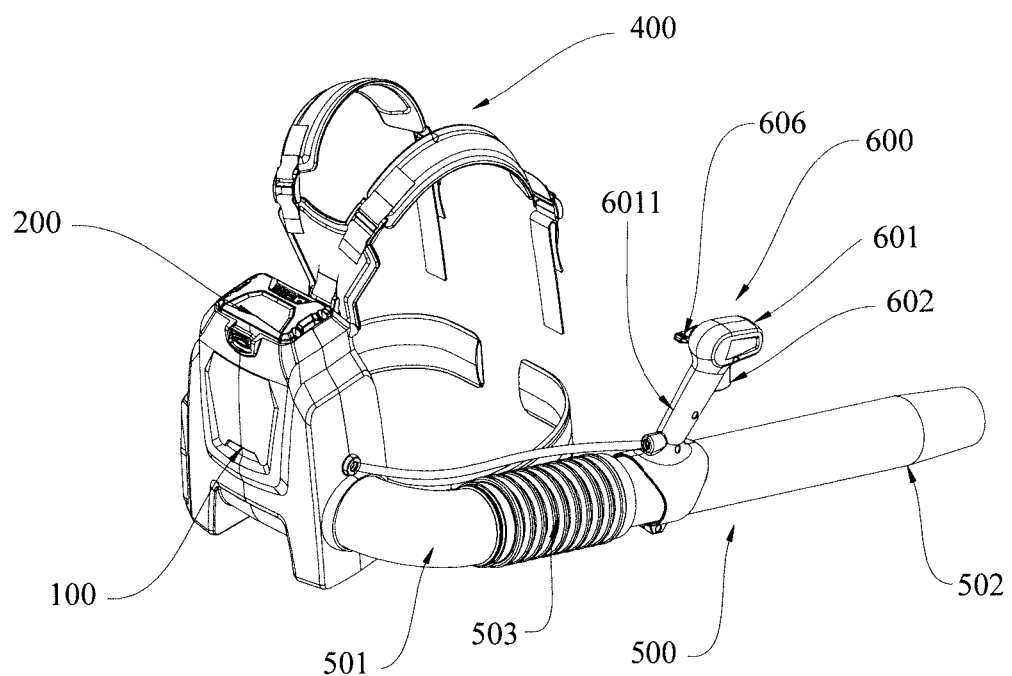
FIG. 3 is a perspective view of a backpack blower in accordance with one embodiment of the present invention.

As shown in FIG. 3, a backpack blower according to one embodiment of the present invention is illustrated. The backpack blower includes a backpack assembly 100, a battery pack 200, a power assembly (not shown in FIG. 3) and a blowpipe component 500 connected to the power assembly. The power assembly blows air out via the blowpipe component 500, so as to clear away waste on the road (e.g., leaves, stones, debris, etc.).

The configurations, position relations and connection relations of the backpack assembly 100, the battery pack 200 and the power assembly are described in the corresponding descriptions of the embodiment as shown in FIG. 1 and FIG. 2, which will not be repeated here.

In one embodiment, the blowpipe component 500 includes an elbow pipe 501, a flexible pipe 503 and a straight pipe 502 connected with each other in order. The flexible pipe 503 can swing around the straight pipe 502 in a certain range, so as to improve the flexibility of the blowpipe component 500. It can be understood that, in other embodiments, the blowpipe component 500 can only include the elbow pipe 501 and the straight pipe 502 directly connected with the elbow pipe 501. The straight pipe 502 can be integrated with the elbow pipe 501 as a unit.

Figure 4:
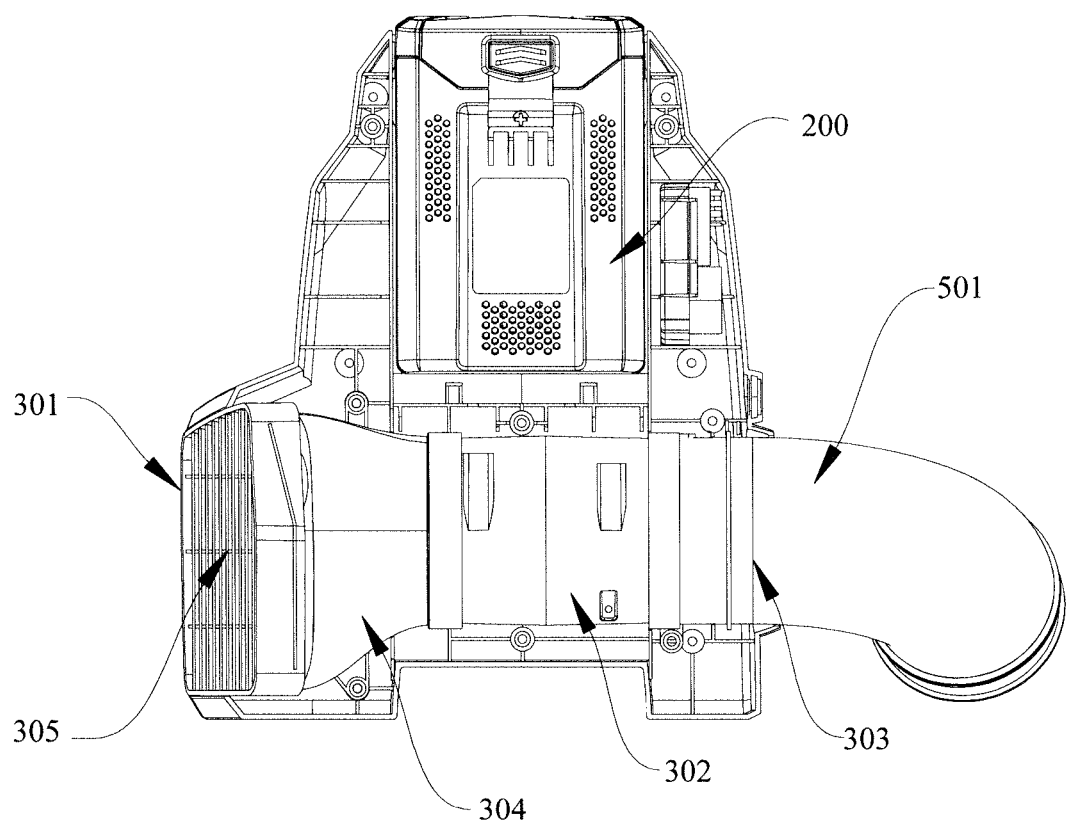
FIG. 4 is a schematic view of a power assembly of the backpack assembly shown in FIG. 3, and in which the power assembly is an axial fan assembly.

In some embodiments, in order to realize the action of blowing air, the power assembly includes an axial fan assembly. Referring to FIG. 4, an axial fan assembly according to one embodiment of the present invention is illustrated.

The axial fan assembly includes a first air vent 301, a motor duct 302 and a second air vent 303 connected in sequence. The first and second air vents 301, 303 are respectively located at two opposite ends of the motor duct 302. The first and second air vents 301, 302 are connected with each other through the motor duct 302. The motor duct 302 for guiding the movement of the air flow is connected with the elbow pipe 501 of the blowpipe component 500 at the second end thereof, so that a cylindrical axial air duct is formed by connecting the motor duct 302 to the elbow pipe 501 through the second air vent 303.

The axial fan assembly is electrically connected with the battery pack 200, to convert the electrical energy provided by the battery pack 200 into mechanical energy and output air flow. Specifically, the axial fan assembly includes a motor (not shown in FIG. 4) and an axial fan (not shown in FIG. 4) both located in the axial air duct. The motor is electrically connected with the battery pack 200 to convert the electrical energy provided by the battery pack 200 into mechanical energy, and the axial fan is connected to an output shaft of the motor. In such a way, the backpack blower achieves blowing action through the airflow passing through the motor duct 302, the elbow pipe 501, the flexible pipe 503 and the straight pipe 502 in order when the axial fan rotating under the driving of the motor.

In some embodiments, in order to reduce turbulence, the axial fan assembly further includes a connecting pipe 304 located upstream of the motor duct 302 along an air flowing direction. For example, the connecting pipe 304 is located at one end of the motor duct 302 close to the first air vent 301 when the airflow flows from the first air vent 301 to the second air vent 303. The connecting pipe 304 is configured with a truncated cone shape and is connected with the motor duct 302 through a smaller diameter end of the connecting pipe. So that the first and second air vents 301, 303 are connected with the motor duct 302 through the connecting pipe 304.

In some embodiments, a vent cover 305 is disposed on the first air vent 301. In some embodiments, the vent cover 305 can be detachably disposed on the first air vent 301. In some embodiments, the vent cover 305 is configured with an arced shape. In some embodiments, the vent cover 305 is configured with a flat shape.

Accordingly, with reference to FIG. 3 and FIG. 4, the backpack blower provided by embodiment of the present invention can be used to clear away waste on the road (e.g., leaves, stones, debris, etc.). Specifically, the backpack blower can achieve blowing action through the straight pipe 502 held by the hand of the worker when the belt assembly 400 carries the backpack assembly 100, the battery pack 200 and the axial fan assembly on the worker's body.

In some embodiments, in order to meet different habits of the users, for example, some users may have the habit of using the right hand, while some users may have the habit of using the left hand, the elbow pipe 501 of the blowpipe component 500 can bend towards the right side of the user (as shown in FIG. 3), or bend towards the left side of the user.

Figure 5:
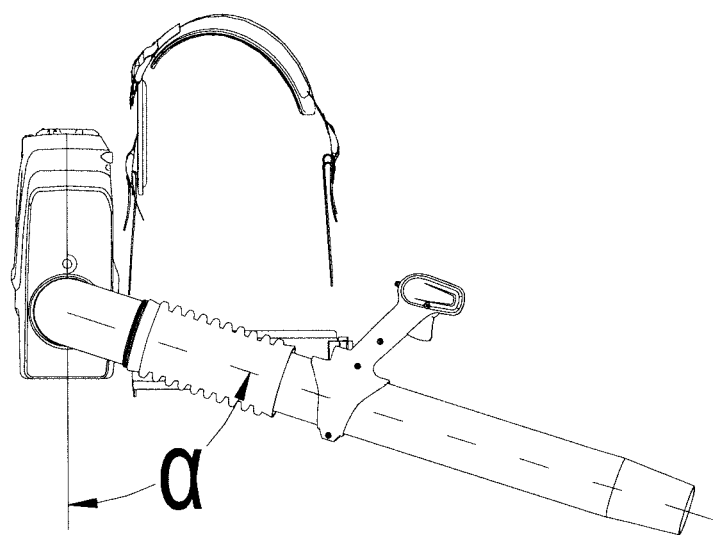
FIG. 5 is a side view of the backpack blower shown in FIG. 3.

In some embodiments, the elbow pipe 501 of the blowpipe component 500 is rotatably connected with the motor duct 302 to rotate an angle α formed between an axial of the straight pipe 502 and a vertical line, as shown in FIG. 5, so as to increase a covering range of the blowpipe component 500.

In some embodiments, the angle α between the axial of the straight pipe 502 of the blowpipe component 500 and the vertical line ranges from 0° to 90°.

In some embodiments, as shown in FIG. 3 and FIG. 4, the motor duct 302 is laterally connected with the elbow pipe 501 to make the axial line of the axial air duct parallel with the horizontal direction.

Figure 6:
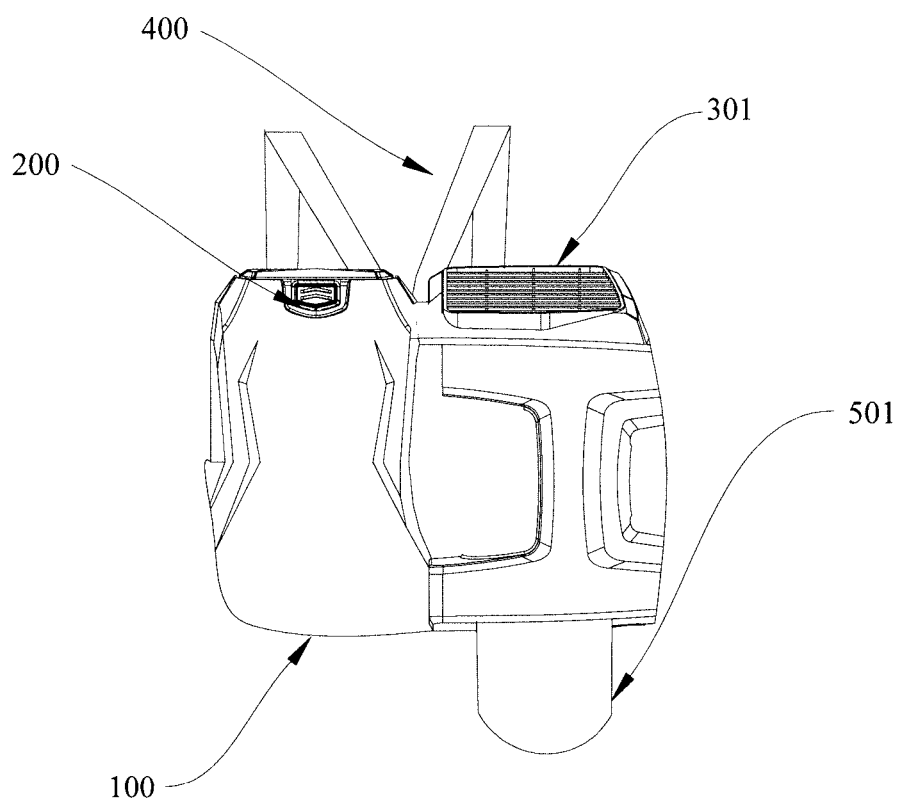
FIG. 6 is a rear view of a backpack blower in accordance with another embodiment of the present invention, showing a power assembly located on the right side and the battery pack located on the left side.
Figure 7:
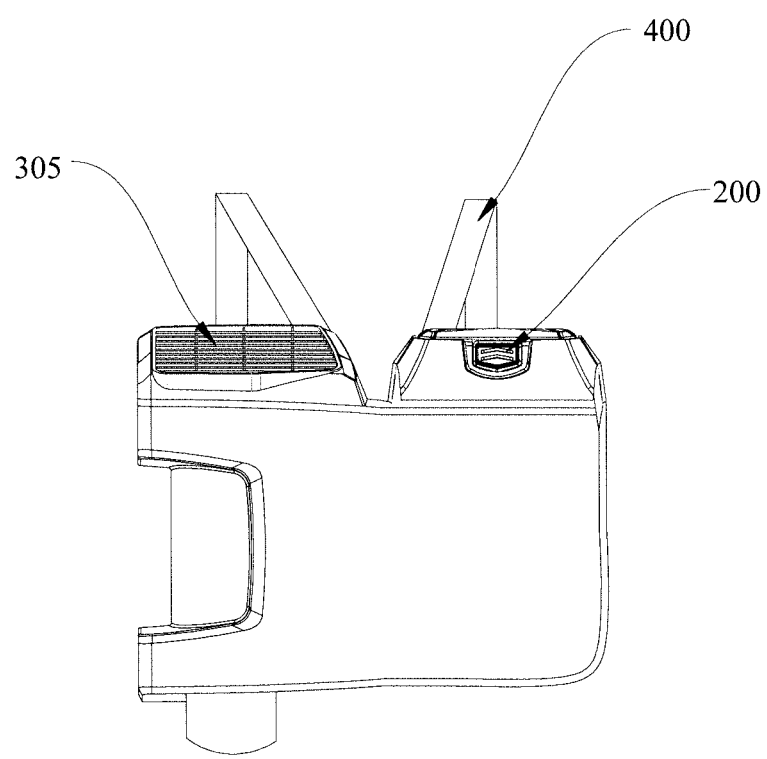
FIG. 7 is a rear view of a backpack blower in accordance with another embodiment of the present invention, showing a power assembly located on the left side and the battery pack located on the right side.

In some embodiments, as shown in FIG. 6 and FIG. 7, the motor duct (not shown in FIG. 6 and FIG. 7) is vertically connected with the elbow pipe 501 to make the axis of the axial air duct vertical. In some embodiments, the axial air duct is located at the right side of the user, and the battery pack 200 is located at the left side of the user, as shown in FIG. 6. In some embodiments, the axial air duct is located at the left side of the user, and the battery pack 200 is located at the right side of the user, as shown in FIG. 7. When the motor duct and the elbow pipe 501 are arranged along the longitudinal direction, if the elbow pipe 501 and the motor duct are rotatably connected, in the course of usage, the straight pipe 501 can swing between the left side and the right side by rotating the elbow pipe 501. Further, the amplitude of the swing achieved by rotating the elbow pipe 501 is larger than that allowed by the flexible pipe 503.

As shown in FIG. 3, in some embodiments, the backpack blower further includes a control handle assembly 600 disposed on the straight pipe 502 to control the power assembly (e.g., the axial fan assembly), so as to control the function assembly (e.g., the blowpipe component 500).

In some embodiments, the control handle assembly 600 includes a handle 601 and a control unit (not labeled) completely or partly disposed in the handle 601.

In some embodiments, the handle 601 includes two handle shells 6011 locked together to form a handle chamber for receiving the control unit. In other words, the handle 601 is a hollow structure including two handle shells 6011. Two handle shells 6011 can be locked together by way of riveting or buckling or screwing.

In some embodiments, the control unit includes a speed-adjusting unit for controlling starting, stopping, and the speed of the axial fan assembly.

In some embodiments, the speed-adjusting unit includes a speed-adjusting button 602 for controlling starting, stopping, and the speed of the power assembly. The backpack blower can achieve blowing action through the airflow passing through the second air vent 303 of the axial fan assembly and entering into the blowpipe component 500 when pressing the speed-adjusting button 602 to start the axial fan assembly. The backpack blower stops blowing when the axial fan assembly stopped by loosening the speed-adjusting button 602 to the initial position. The backpack blower can adjust the speed of blowing through pressing the speed-adjusting button 602 to different positions.

In some embodiments, the control unit further includes a speed-fixing unit (not shown in FIG. 3) to maintain the speed-adjusting button 602 at a fixed position, so as to make the speed of the axial fan assembly constant.

In some embodiments, the control unit further includes an extreme-speed unit (not shown in FIG. 3) for controlling the axial fan assembly at full power.

Figure 8:
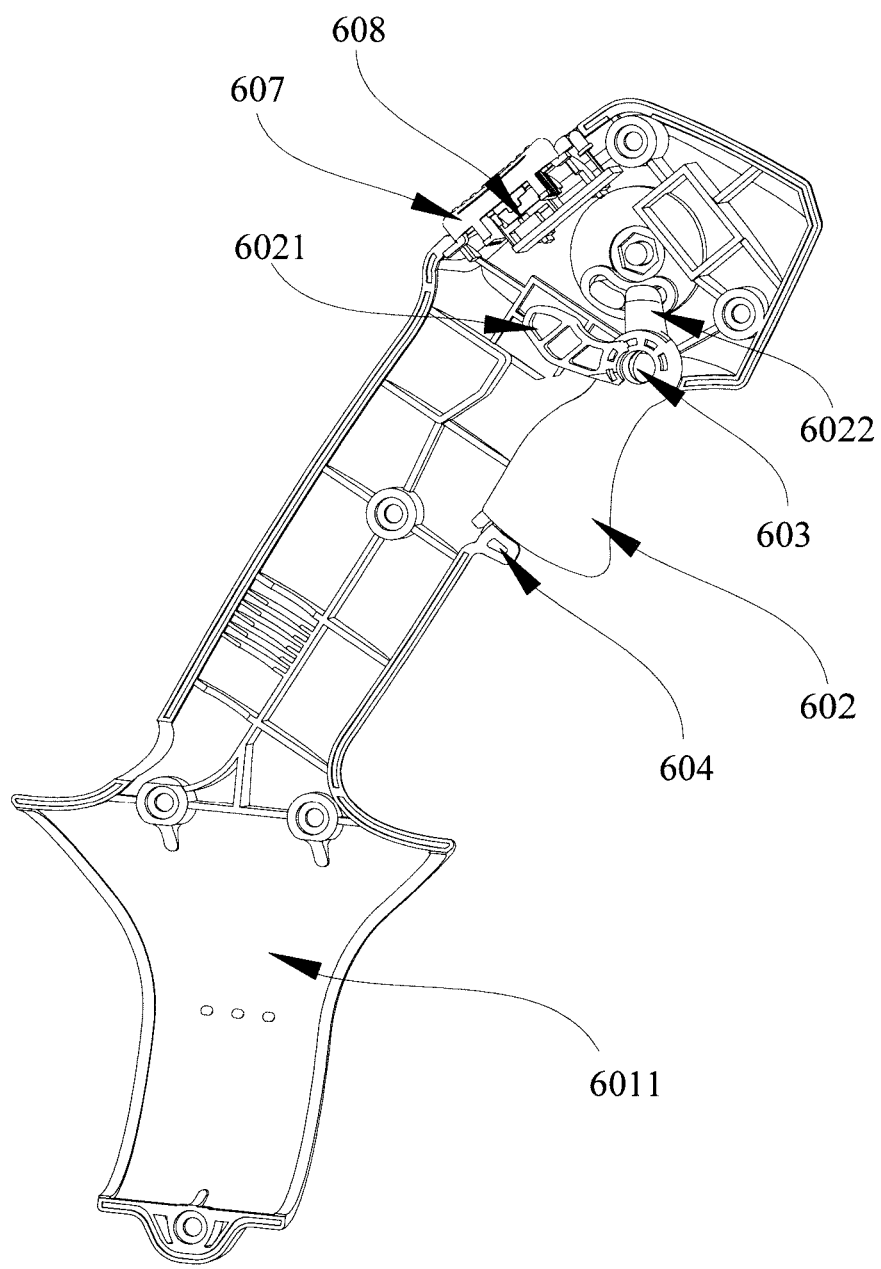
FIG. 8 is a schematic view of a control handle assembly according to one embodiment of the present invention.
Figure 9:
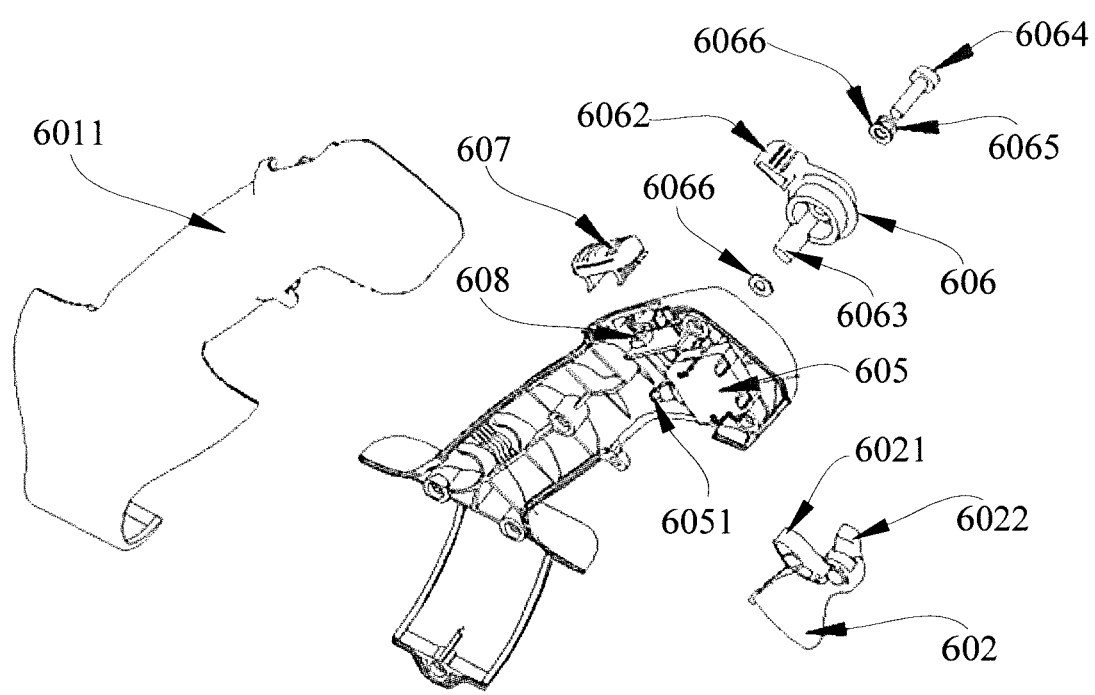
FIG. 9 is an exploded view of the control handle assembly shown in FIG. 8.

As shown in FIG. 8 and FIG. 9, a control handle assembly for controlling the backpack tool according to one embodiment of the present disclosure is illustrated. The control handle assembly includes a speed-adjusting unit for controlling the start-stop and the speed of the backpack tool.

The speed-adjusting unit includes a speed-adjusting button 602, a fixing post 603, a guiding mechanism 604, a speed-adjusting switch 605 and a first control circuit (not shown). The speed-adjusting button 602 is installed onto the handle shell 6011 via the fixing post 603 and the guiding mechanism 604. The speed-adjusting button 602 can rotate around the fixing post 603. The guiding mechanism 604 is used to guide the rotation of the speed-adjusting button 602. The speed-adjusting button 602 is provided with a first protrusion 6021. The first protrusion 6021 of the speed-adjusting button 602 can contact a triggering post 6051 of the speed-adjusting switch 605 to achieve the connection between the speed-adjusting switch 605 and the first control circuit when the speed-adjusting button 602 is pressed to rotate about the fixing post 603, so as to control the start of the backpack tool through the control circuit. The triggering post 6051 can be configured as a telescopic structure. The speed of the tool such as the blowing speed of the backpack blower can be adjusted through adjusting the length of the triggering post 6051 which corresponds to the extent of rotation of the speed-adjusting button 602 when the triggering post 6051 is connected with the first protrusion 6021 of the speed-adjusting button 602. The first control circuit can be set to increase the speed of the power assembly when the length of the triggering post 6051 increased and reduce the speed of the power assembly to zero (e.g., to stop the tool from running) when the triggering post 6051 is not pressed.

In some embodiments, the control handle assembly may further include a reset spring (not shown) with one end connected to the speed-adjusting button 602 and the other end connected to the handle shell 6011. The speed-adjusting button 602 resets to its initial position under the force of the reset spring. For example, when the control handle assembly 600 is used to control the backpack blower, the action of blowing air stops by resetting the speed-adjusting button 602 via the resetting spring when the operator releases the speed-adjusting button 602.

In some embodiments, as shown in FIG. 9, the control unit further includes a speed-fixing unit (not labeled) to maintain the speed-adjusting button 602 at a fixed position, so as to make the speed of the backpack tool constant. For example, when the control handle assembly 600 is used to control the backpack blower, the speed of the axial fan assembly can be fixed by maintaining the speed-adjusting button 602 at a fixed position via the speed-fixing unit.

In some embodiments, the speed-fixing unit includes a speed-fixing knob 606 for fixing the speed-adjusting button 602 to make the speed of the tool constant and the power or airflow output by the tool constant. For example, the speed-fixing knob 606 is fixed at a position to make the blowing speed of the axial fan assembly constant when pressing speed-adjusting button 602 to start the axial fan assembly.

Figure 10:
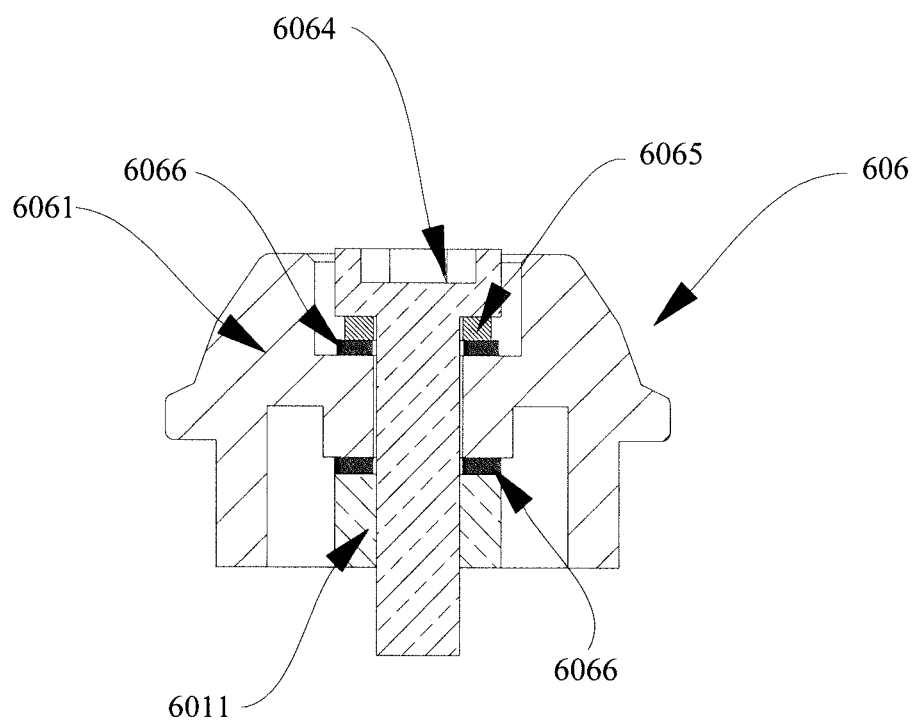
FIG. 10 is an assembly view of a speed-fixing knob of the control handle assembly shown in FIG. 9.

Referring to FIG. 9 and FIG. 10, the speed-fixing knob 606 has a knob body 6061 rotatably fixed on the handle shell 6011. The knob body 6061 defines a driving post 6062 and a retaining portion 6063 formed thereon. The retaining portion 6063 can move when the knob body 6061 is rotated. The knob body 6061 can rotate when pressing the driving post 6062. The retaining portion 6063 of the speed-fixing knob 606 can abut against a second protrusion 6022 of the speed-adjusting button 602 to prevent the speed-adjusting button 602 from rotating and maintain the speed-adjusting button 602 at a fixed position when rotating the knob body 6061 of the speed-fixing knob 606 to drive the retaining portion 6063.

It should be noted that, in some embodiments, the knob body 6061 may not be provided with the driving post 6062.

In some embodiments, the speed-fixing unit can further include a fixing shaft 6064 penetrating through the knob body 6061 by way of a threaded connection. The retaining portion 6063 can rotate along an axial direction of the fixing shaft 6064 when the knob body 6061 rotating around the fixing shaft 6064.

In some embodiments, the fixing shaft 6064 can be configured into a bolt, or a threaded rod, or a screw.

So that the retaining portion 6063 of the speed-fixing knob 606 can abut against the second protrusion 6022 of the speed-adjusting button 602 to limit the rotation of the speed-adjusting button 602 when the knob body 6061 rotates around the fixing shaft 6064 and drives the retaining portion 6063 to move along an axial direction of the fixing shaft 6064.

In some embodiments, the fixing shaft 6064 includes dampers 6065 respectively located at two opposite ends thereof to buffer an axial movement of the retaining portion 6063.

In some embodiments, the damper 6065 can be a spring washer, or a wave washer or a cup washer.

In some embodiments, a plurality of spacers 6066 can be disposed between the fixing shaft 6064 and the knob body 6061, and/or between the knob body 6061 and the handle shell 6011.

As shown in FIG. 8, the control unit can further include an extreme-speed unit (not labeled) for controlling the backpack tool at full power.

The extreme-speed unit includes a micro switch 608, an extreme-speed button 607 rotatably assembled on the handle shell 6011 to contact the micro switch 608, and a second control circuit (not shown) connected with the micro switch 608. The second control circuit is configured to cause the backpack tool to run at full power when the extreme-speed button 607 contacts the micro switch 608.

Specifically, taking the control handle assembly 600 for controlling the backpack blower as an example, the second control circuit can increase the blowing speed of the axial fan assembly to the maximum value to make the backpack blower move the heavy objects (e.g., stones, fragments of brick, etc.) away when the extreme-speed button 607 is pressed to contact the micro switch 608. The second control circuit can restore the blowing speed of the axial fan assembly to an initial speed when the extreme-speed button 607 is released, allowing the extreme-speed button 607 and the speed-adjusting button 602 to work independently.

It can be seen that, the backpack blower provided by embodiments of the present invention can realize the action of blowing air. Further, when the control handle assembly 600 is applied to control the backpack blower, starting, stopping, and the speed of the backpack blower can be controlled to meet different requirements under the control of the speed-adjusting button 602, the speed-fixing knob 606 and the extreme-speed button 607 of the control handle assembly 600.

In one embodiment, the backpack tool also can be configured to realize suction action to suck an object (e.g., leaves). The suction action can be achieved by modifying the backpack blower as shown in FIG. 3 and FIG. 4. Specifically, the change of the airflow direction is caused by modifying the rotating direction of the motor and the rotating direction of the axial fan assembly and the suction action is achieved through changing the airflow direction to make the airflow pass through the straight pipe 502, the flexible pipe 503, the elbow pipe 501 and the motor duct 302 in order and flow out from the first vent 301. In some embodiments, the backpack tool further comprises a collection bag for collecting the sucked objects. The backpack tool may also have a chopping device for chopping the sucked objects to prevent the axial air duct from being blocked.

In some embodiments, the backpack tool can achieve the action of spraying water. The action of the spraying water is achieved by modifying the backpack blower as shown in FIG. 3 and FIG. 4. Specifically, the function assembly is configured into a water-spraying component (including a reservoir). In this case, the power assembly includes a motor connected with the battery pack 200 for converting the electrical energy provided by the battery pack 200 to mechanical energy and an axial fan connected to an output end of the motor. The axial fan is rotated by the driving of the motor, so as to generate air flow to achieve the water-spraying function of the water-spraying component.

In some embodiments, the backpack tool is configured to achieve the action of cutting grass. Specifically, the function assembly is configured into a grass-cutting component (including a grass trimmer). The power assembly includes a motor connected with the battery pack 200 for converting the electric energy provided by the battery pack 200 into mechanical energy. An output of the motor is connected with the grass-cutting component to drive the grass-cutting component for achieving the action of cutting grass.

In some embodiments, the function assembly is detachably installed to the power assembly. Accordingly, different functions can be realized by changing different function assemblies. Therefore, the scope of use of the backpack tool is enhanced.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:
1. A backpack blower comprising:
a battery pack for providing electrical energy;
a power assembly electrically connected with the battery pack to convert the electrical energy provided by the battery pack into mechanical energy, the power assembly having an axial fan assembly including a first air vent, a motor duct and a second air vent connected in sequence, an axial air duct being formed by connecting the motor duct to an elbow pipe via the second air vent;
a backpack assembly configured to be carried on a human back to support the battery pack and the power assembly;
a blowpipe component connected to the power assembly to blow air out, the blowpipe component including the elbow pipe, a flexible pipe and a straight pipe connected with each other in order; and
a control handle assembly including a speed-adjusting unit for controlling starting, stopping, and a speed of the axial fan assembly;
wherein the speed-adjusting unit comprises a fixing post, a speed-adjusting button rotatable around the fixing post and a guiding mechanism for guiding rotation of the speed-adjusting button, the speed-adjusting unit further including a speed-adjusting switch and a first control circuit, and wherein the speed-adjusting button defines a first protrusion for connecting with the speed- adjusting switch during rotation, and wherein the first control circuit is configured to control starting, stopping, and the speed of the axial fan assembly when the first protrusion is in contact with the speed-adjusting switch, and the control handle assembly further comprises a speed-fixing unit to maintain the speed-adjusting button at a fixed position for making the speed of the axial fan assembly constant;

wherein the speed-fixing unit comprises a speed-fixing knob provided with a knob body and a retaining portion, and wherein the speed-adjusting button has a second protrusion abutting against the retaining portion of the speed-fixing knob during rotation of the knob body of the speed-fixing knob to limit the speed-adjusting button to the fixed position;

wherein each axial end of the fixing shaft comprises a damper for buffering the axial movement of the retaining portion, and wherein the damper comprises at least one of a spring washer, a wave washer, and a cup washer.

2. The backpack blower according to claim 1, wherein the axial fan assembly further comprises a connecting pipe located upstream of the motor duct along an air flowing direction, and wherein the connecting pipe is configured with a truncated cone shape and is connected with the motor duct through a smaller diameter end of the connecting pipe.

3. The backpack blower according to claim 1, wherein the motor duct is rotatably connected with the elbow pipe.

4. The backpack blower according to claim 1, wherein the speed-adjusting unit further includes a reset spring connected with the speed-adjusting button to reset the speed-adjusting button.

5. The backpack blower according to claim 1, wherein the speed-fixing unit further comprises a fixing shaft penetrating through the knob body by way of a threaded connection, and wherein the retaining portion is driven along an axial direction of the fixing shaft when the knob body rotates around the fixing shaft.

6. The backpack blower according to claim 1, wherein the control handle assembly further comprises an extreme-speed unit, for controlling the axial fan assembly at full power.

7. The backpack blower according to claim 6, wherein the extreme-speed unit includes an extreme-speed button, a micro switch and a second control circuit, and wherein the second control circuit causes the axial fan assembly to run at full power when the extreme-speed button is pressed to contact the micro switch.

8. A control handle assembly for controlling a backpack blower comprising:

a speed-adjusting unit for controlling starting, stopping, and a speed of a backpack blower, the speed-adjusting unit including:
a fixing post;
a speed-adjusting button rotatable around the fixing post;
a guiding mechanism for guiding rotation of the speed-adjusting button;
a speed-adjusting switch;
a first control circuit;
wherein the speed-adjusting button comprises a first protrusion for connecting with the speed-adjusting switch during rotation, and wherein the first control circuit is configured to control starting, stopping, and the speed of the backpack blower when the first protrusion is in contact with the speed-adjusting switch; and
a speed-fixing unit to maintain the speed-adjusting button at a fixed position for making the speed of the backpack blower constant;
wherein the speed-fixing unit comprises a speed-fixing knob comprising a knob body and a retaining portion, and wherein the speed-adjusting button has a second protrusion abutting against the retaining portion of the speed-fixing knob during rotation of the knob body of the speed-fixing knob to limit the speed-adjusting button to the fixed position;
wherein the speed-fixing unit further comprises a fixing shaft penetrating through the knob body through a threaded connection, and wherein the retaining portion is driven to move along an axial direction of the fixing shaft when the knob body rotates around the fixing shaft;
wherein each axial end of the fixing shaft is provided with a damper for buffering axial movement of the retaining portion, and wherein the dampers comprise at least one of a spring washer, a wave washer, and a cup washer.

9. The control handle assembly according to claim 8, wherein the speed-adjusting unit further comprises a reset spring connected with the speed-adjusting button to reset the speed-adjusting button.

10. The control handle assembly according to claim 8, wherein the control handle assembly further comprises an extreme-speed unit for controlling the backpack blower at full power.

11. The control handle assembly according to claim 10, wherein the extreme-speed unit comprises an extreme-speed button, a micro switch and a second control circuit, and wherein the second control circuit causes the backpack blower to run at full power when the extreme-speed button is pressed to contact the micro switch.

\* \* \* \* \*